A. P. TABER.
LOOP FORMING MECHANISM FOR MOVING PICTURE MACHINES.
APPLICATION FILED JULY 18, 1916.
1,258,499.
Patented Mar. 5, 1918.
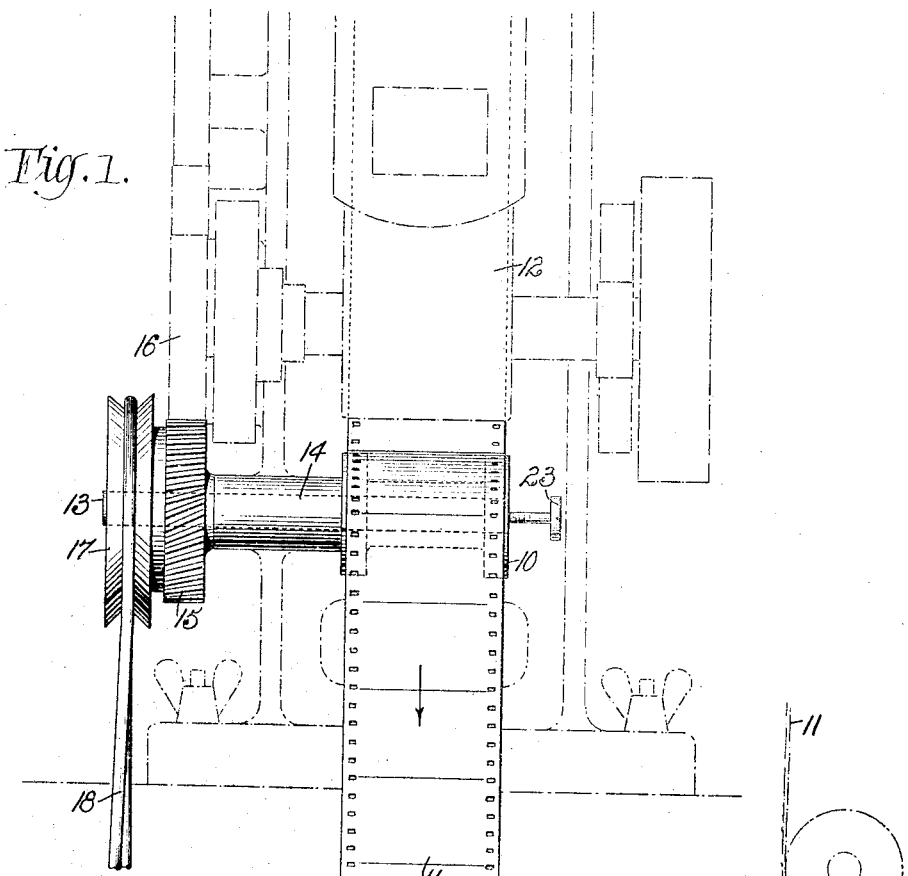
WITNESSES
Frederick Diehl.
Rudy. Koster.
INVENTOR
Arthur P. Taber
BY Munn & Co
ATTORNEYS

UNITED STATES PATENT OFFICE.

ARTHUR PRATT TABER, OF RED WING, MINNESOTA.

LOOP-FORMING MECHANISM FOR MOVING-PICTURE MACHINES.

1,258,499.  Specification of Letters Patent.  Patented Mar. 5, 1918.

Application filed July 18, 1916. Serial No. 109,877.

*To all whom it may concern:*

Be it known that I, ARTHUR PRATT TABER, a citizen of the United States, and a resident of Red Wing, in the county of Goodhue and State of Minnesota, have invented a new and Improved Loop-Forming Mechanism for Moving-Picture Machines, of which the following is a full, clear, and exact description.

The invention relates to moving picture machines in which a top loop is formed between the supply reel and the upper feed sprocket, and a bottom loop is formed between the intermittent feed sprocket and the lower take-up feed sprocket which feeds the film to the take-up device.

The object of the invention is to provide a new and improved loop-forming mechanism arranged to permit of readily forming a loop, especially the bottom loop, in case the old loop is taken up or destroyed, and without stopping the moving picture machine.

In order to accomplish the desired result, use is made of a continually rotating feed sprocket over which the film passes from the intermittent sprocket of the moving picture machine, and a driven shaft for the said feed sprocket to normally rotate the latter continually, the said shaft being mounted to slide in the direction of its length and the said continually rotating feed sprocket being mounted to turn with the said shaft and being arranged to allow the shaft to slide therein, the said shaft when in temporary shifted position being out of gear with its driving mechanism to stop the rotation of the shaft and its feed sprocket, the latter remaining in its proper position with respect to the intermittent sprocket during the time the shaft is temporarily shifted into non-driven position to allow of reforming a film loop.

A practical embodiment of the invention is represented in the accompanying drawings forming a part of this specification, in which similar characters of reference indicate corresponding parts in all the views.

Figure 1 is a front elevation of the improved loop-forming mechanism for a moving picture machine;

Fig. 2 is an enlarged sectional front elevation of the same; and

Fig. 3 is an end view of the same.

In moving picture machines as generally constructed top and bottom loops are formed in the film to insure a proper intermittent feeding of the film in the projecting field, the upper loop extending between the intermittent sprocket and the continually rotating upper feed sprocket, and the lower loop extending between the intermittent feed sprocket and the lower take-up feed sprocket which feeds the film to the take-up device. The lower take-up feed sprocket 10 over which the film 11 passes after it leaves the intermittent feed sprocket 12 is mounted to turn with a shaft 13 journaled in a bearing 14 forming part of the main frame of the moving picture machine, as indicated in the drawings. The shaft 13 is provided with the usual gear wheel 15 in mesh with the driving gear 16 of the moving picture machine to continually rotate the shaft 13 and the feed sprocket 10. On the gear wheel 15 is secured a pulley 17 connected by a belt 18 with the take-up device to drive the latter.

The shaft 13 is provided with a longitudinally extending keyway 20 into which projects a key 21, preferably formed on the inner end of a screw 22 screwing in the hub of the feed sprocket 10. By the arrangement described the feed sprocket 10 rotates with the shaft 13 but the latter is free to slide in its bearing 14 without disconnecting the sprocket 10 from the shaft for disconnecting the gear wheel 15 from the driving gear 16. The inner end of the sprocket 10 abuts against one end of the bearing 14 and the gear wheel 15 abuts against the other end of the said bearing as long as the shaft 13 is in its normal driving position. The end of the shaft 13 at the outer end of the sprocket 10 is provided with a handle 23 adapted to be taken hold of by the operator to shift the shaft 13 from the right to the left with a view to move the gear wheel 15 out of mesh with the driving gear 16 but without changing the position of the sprocket 10 with respect to the intermittent sprocket 12. It will be noticed that when the machine is running and the loop 30 in the film 11 breaks or is taken up then it is only necessary for the operator to push on the handle 23 so as to shift the shaft 13 in the direction of the arrow $a'$ whereby the gear wheel 15 is moved out of mesh with the driving gear 16 and the shaft 13 comes to a stop and with it the sprocket 10 as well as the take-up device driven from the shaft 13 by the pulley 17 and the belt 18, as previously mentioned. As the machine is kept running the film is fed downward and the portion below the intermittent feed sprocket 12 can be readily formed into a loop and engaged with the lower take-up feed sprocket 10, after which the shaft 13 is returned to its normal active position by the operator either pulling on the handle 23 or pushing against the outer face of the pulley 17. By this return movement of the shaft 13 the gear wheel 15 again moves in mesh with the driving gear 16 so that the shaft 13 and its sprocket 10 are again rotated to feed the film to the take-up device with the loop 30 intermediate the sprockets 10 and 12.

It will be noticed that the head of the handle 23 is sufficiently large to abut against the face of the sprocket 10 on pushing the shaft 13 from the right to the left thus limiting the shifting movement of the shaft and preventing it from disengagement with the sprocket 10.

The loop-forming mechanism shown and described is very simple in construction and requires but a slight change in the mechanism of the moving picture machine now generally constructed.

Having thus described my invention, I claim as new and desire to secure by Letters Patent:—

1. In a moving picture machine, a shaft mounted to turn and slide and having a driven gear wheel and the driving pulley of the take up device fixedly secured to one end thereof, a feed sprocket mounted on the other end of the shaft to turn therewith and to permit the shaft to slide therein, and a headed handle secured to the end of the shaft carrying the feed sprocket to extend in alinement therewith, the head of the handle limiting the sliding movement of the shaft and preventing its disengagement from the sprocket.

2. In a moving picture machine, a shaft mounted to slide and turn and having a keyway therein, a feed sprocket on one end of the shaft and in which the said shaft slides, said sprocket having a key engaging the keyway of said shaft, a driven gear wheel fixedly secured to the other end of the shaft and carrying the driving pulley of the take up device, and means for sliding said shaft to move the said gear and out of mesh with its driving gear.

ARTHUR PRATT TABER.

Copies of this patent may be obtained for five cents each, by addressing the "Commissioner of Patents, Washington, D. C."